Aug. 9, 1960
O. T. WOOD
2,948,180
TWO-PART PLASTIC FLANGE
Filed April 16, 1956
2 Sheets-Sheet 1
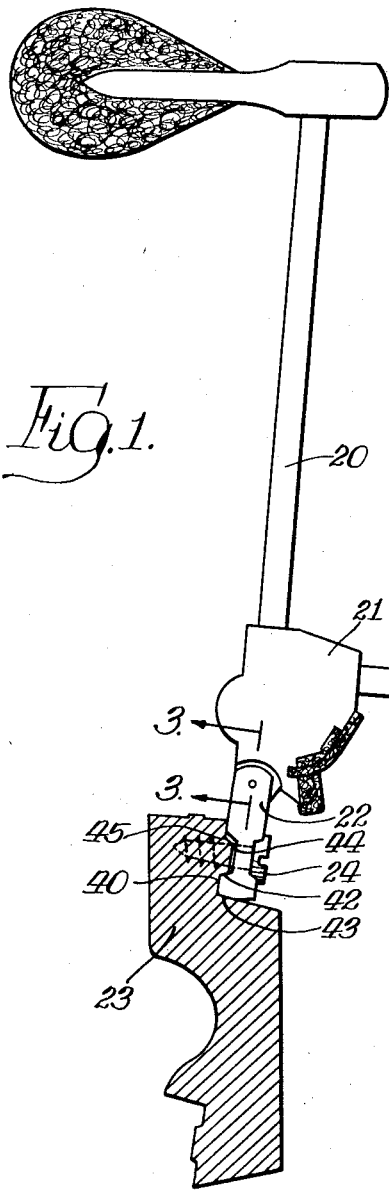
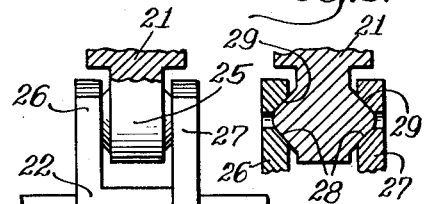
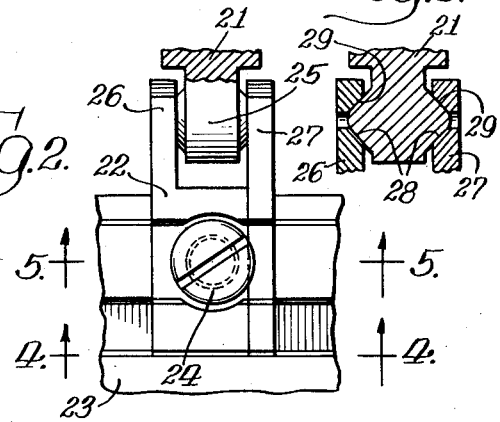
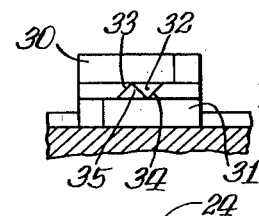
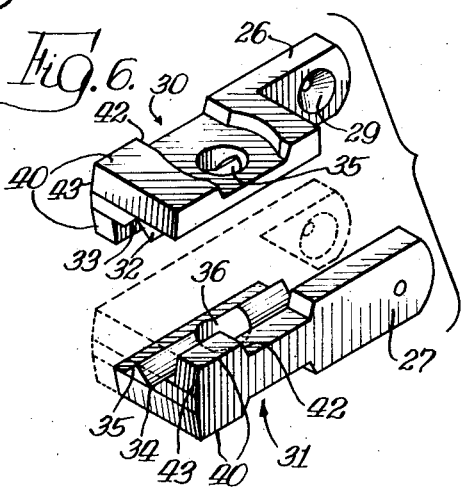
INVENTOR.
Orville T. Wood,
BY Mueller & Aichele
Atty's.

Aug. 9, 1960 O. T. WOOD 2,948,180
TWO-PART PLASTIC FLANGE
Filed April 16, 1956 2 Sheets-Sheet 2
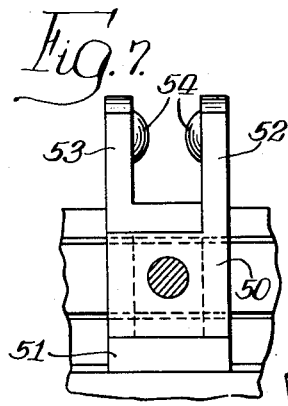
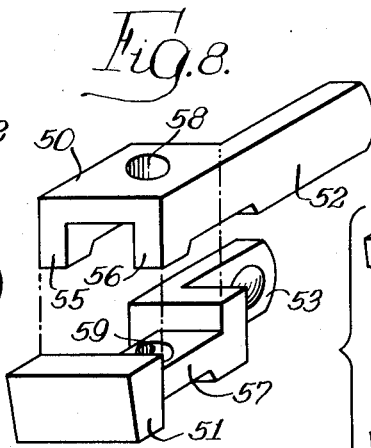
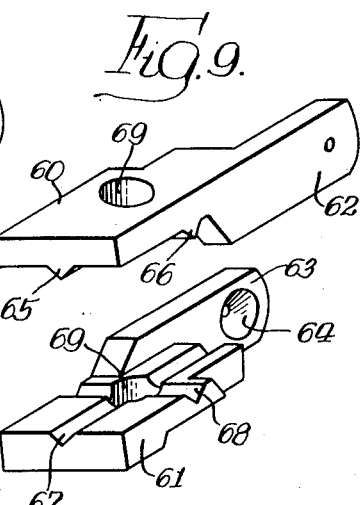
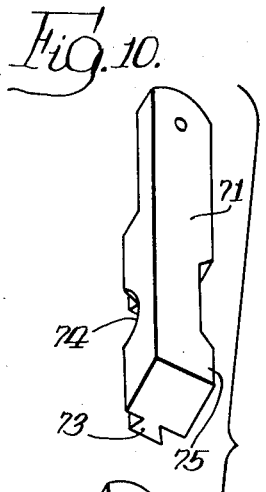
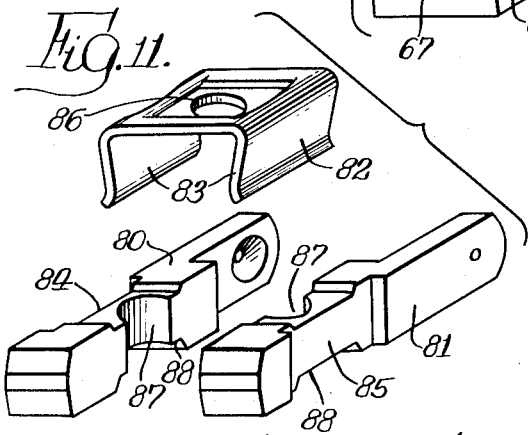
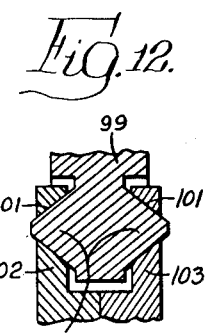
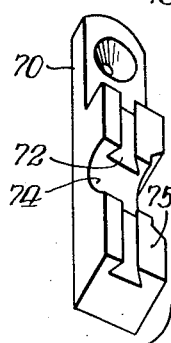
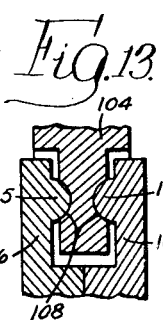
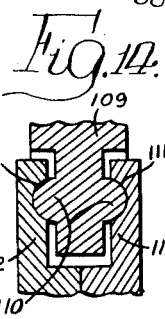
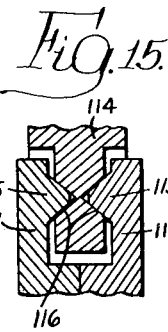
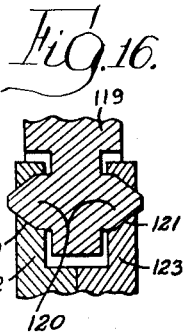
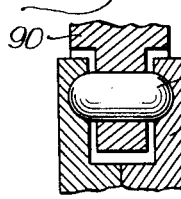
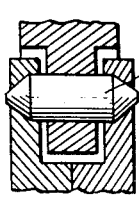
INVENTOR.
Orville T. Wood,
BY Mueller & Aichele
Atty's.

United States Patent Office 2,948,180
Patented Aug. 9, 1960

2,948,180
TWO-PART PLASTIC FLANGE

Orville T. Wood, Essex, Conn., assignor to Pratt, Read & Co., Incorporated, Ivoryton, Conn., a corporation of Connecticut Filed Apr. 16, 1956, Ser. No. 578,466

9 Claims. (Cl. 84—251)

This invention relates generally to piano actions, and more particularly to improved pivot bearings for moving members in such actions.

It is necessary to provide a highly accurate and extremely noiseless pivotal connection between the various moving parts in a piano action. It has been customary to make such parts of wood with metal pins being placed through openings in the wooden parts to provide the pivotal bearings. In order to provide a smooth, accurate bearing, the openings drilled in the wood, which are somewhat rough in themselves, are lined with felt and the felt engages the metal pin to provide the pivotal connection. It is apparent that such a construction requires very precise workmanship and hence is extremely costly. Further the wood and the felt both tend to absorb moisture which changes their characteristics. Also, the parts made in this manner are of more or less hand-made construction so that variations occur from one part to another and a great deal of regulation is required to adjust a plurality of moving parts in an action so that they move in corresponding manners.

Although it has been proposed to use pivotal connections of other types, such as pivotal connections formed by plastic material, these have not been entirely satisfactory. Drilling of holes in plastic material or coring holes therein results in variations in dimensions which produce inaccurate bearings.

It is therefore an object of the present invention to provide a simple and improved bearing for pivotal members of piano actions.

Another object is to provide a bearing for piano actions which requires no bushing or lining within the bearing opening.

A further object of the invention is to provide an improved flange construction for providing pivotal mountings for movable members of piano actions which may be molded of plastic material, dyecast of metal or pressed of powdered metal.

A feature of the invention is the provision of a two-part flange having bearings surfaces formed in the two parts of the flange which when assembled cooperate with bearing surfaces of a movable member to provide a pivotal mounting therefor.

A further feature of the invention is the provision of a two-part flange construction wherein the parts when assembled provide a pivotal mounting for a movable member, and wherein the parts are held assembled by the means which secures the flange to a rail of the piano action.

Another feature of the invention is the provision of a two-part flange for a piano action including two parts which are identical and may be molded formed from a single dye or cast, providing large quantity production at very low cost.

Further objects, features and the attending advantages of the invention will be apparent upon consideration of the following description when taken in connection with the accompanying drawings:

Fig. 1 illustrates a hammer of a piano action and a pivotal mounting flange therefor in accordance with the invention;

Figs. 2–6 show in detail the construction of the flange of Fig. 1;

Fig. 7 is an elevation view and Fig. 8 an exploded perspective view which illustrate a second embodiment of the two part flange construction;

Fig. 9 is an exploded perspective view illustrating another embodiment of the two part flange construction;

Fig. 10 is an exploded perspective view illustrating a two part flange construction with dove tail mating configuration;

Fig. 11 is an exploded perspective view illustrating a further embodiment of the two part flange construction;

Fig. 12 is a sectional view illustrating the bearing elements of the two part flange and movable member;

Fig. 13 is a sectional view illustrating the bearing elements of the two part flange and movable member construction shown in Fig. 7;

Fig. 14 is a sectional view illustrating the shape of the bearing elements of Figs. 9, 10, and 11;

Fig. 15 is a sectional view illustrating the bearing elements of the two part flange and movable member construction generally reversed from that shown in Fig. 12;

Fig. 16 is a sectional view illustrating a modification in the shape of the bearing elements shown in Fig. 12;

Fig. 17 is a sectional view illustrating a modification in the boss construction of the bearing element in the movable member;

Fig. 18 is a sectional view illustrating a second modification in the boss construction of the bearing element in the movable member; and Fig. 19 is a sectional view illustrating a further embodiment of the bearing construction of the two part flange and movable member.

In practicing the invention, flanges for providing pivotal mounting of various members of piano actions are provided as a two-part construction, with the two parts being assembled with the moving member to provide a pivotal connection. Each of the parts includes an arm and the parts have inter-engaging portions which facilitate holding the parts in desired relation with the two arms spaced to receive the pivotal member therebetween. The flange arms may have pivot recesses to receive projections formed on the movable member so that a pivotal mounting is provided directly between the flange parts and the movable members. Alternatively the flange parts may have projections which fit in recesses in the movable member, or the movable member may have an insert therein which fits in recesses in the flange. The two parts of the flange are held together by the same means which holds the flange on a rail in the piano action. The parts may have overlying portions with aligned apertures therein through which a screw passes which is threaded into the rail. The two-parts which form a flange may be of identical configuration so that both may be molded from a single mold when plastic material is used, or may be cast or pressed from a single die when metal is used. Various constructions of the inter-engaging pivotal portions may be used.

Referring now to the drawings, in Fig. 1 there is shown the hammer 20 of a piano action having a butt 21 pivotally mounted on the flange 22 which is connected to fixed rail 23 by screw 24. As is more clearly shown in Figs 2 and 3 the hammer butt 21 has a pivot portion 25 extending between arms 26 and 27 of the flange 22. The pivot portion may include projections 28 cooperating with recesses 29 in the arms 26 and 27 of the flange.

As will be apparent from Fig. 6, the arms 26 and 27 are actually provided on two separate parts which form the flange 22. These parts designated 30 and 31 may be identical to each other and fit together in a predetermined way so that the flange forms a unitary member. The part 30 has a projection 32 and recess 33 which fit with the recess 34 and projection 35 respectively of part 31 to hold the two parts in desired relationship. Fig. 4 shows more clearly the cooperation of the projection 32 and recess 33 of the part 30 with the recess 34 and projection 35 of the part 31. The part 30 has an aperture 35 which is aligned with the aperture 36 in part 31 when the parts are positioned in assembled relation, so that the mounting screw 24 which is inserted through the apertures to hold the flange on the rail also holds the two parts of the flange in rigid assembled relation. Fig. 5 shows more clearly the locking of the parts in desired relationship by the mounting screw 24.

To further hold the two parts of the flange in alignment, and also to provide a more secure connection to the fixed rail 23, notched portions 40 are provided on the two opposite sides of both parts of the flange. The notched portions in the two parts are aligned when the parts are assembled as shown in Fig. 1. Edges 42 and 43 fit with complementary edges on the rail 23 to accurately position the two parts of the flange on the rail. Clearance is provided at 44 and 45 so that the notch may be effectively used. The head of the screw 24 fits in a recess on the top side of the flange adjacent the notched portions and holds the parts securely assembled.

As previously stated, the two parts of the flange, that is, the parts 30 and 31 are entirely identical with each other and a large number of parts may be provided with any two being used together to form a flange. This greatly facilitates the manufacture of the flange since all parts can be molded from a single mold in the event that plastic material is used or may be die cast or pressed from a single die in the event that metal is used. The two-part flange makes it possible to assemble the flange and a movable part on which a pivot is provided by the use of integral provisions on the flange and the movable member. This eliminates the requirement of an axle or other bearing part and the cost of providing such a part which is precise enough to provide accurate pivotal movement. As mentioned above, bearings having felt bushings have previously been found to be necessary for piano actions resulting in relatively expensive parts. However, the bearing surfaces provided on the flange and the hammer butt as illustrated have been found to provide highly accurate and quiet pivotal mountings.

Figs. 7 and 8 show a second embodiment of the two-part flange construction in accordance with the invention. In this construction the parts 50 and 51 are not of identical configuration. The parts have arms 52 and 53 extending therefrom so that the assembled flange is of generally the same configuration as that shown in Figs. 1 to 6. In this construction the arms have inwardly projecting bearing surfaces 54 which cooperate with recesses in the pivotal member. This construction is shown generally in Fig. 13. The part 50 has downwardly extending arms 55 and 56 which surround the central portion 57 of the part 51 so that when the parts are assembled they fit snugly together to form a unitary assembly. The parts include openings 58 and 59 which are aligned when the parts are assembled and which receive the mounting screw so that this screw serves both to hold the two parts in assembled relation and also to hold the flange on a fixed rail in the piano action.

A further embodiment of the invention is illustrated in Fig. 9. In this construction the parts 60 and 61 have arms 62 and 63 extending therefrom to form bearing portions. The bearing surface is illustrated as a recess 64 as in the first embodiment, but it will be obvious that either a recess or a projection may be used on the flange with a complementary surface being used on the movable member to be held therebetween. The part 60 has V-shaped projections 65 and 66 which are shaped to fit in V-shaped recesses 67 and 68 in the part 61. This is effective to position the two parts with respect to each other in right angle directions so that completely accurate positioning is provided. The parts have aligned apertures 69 therein for the mounting screw which holds the parts assembled and also mounts the same on the fixed rail of the piano action.

In Fig. 10 another construction is illustrated wherein the parts 70 and 71 are interlocked with each other through a dovetail joint. The recess 72 on the part 70 receives the dovetail projection 73 on the part 71. These parts have projecting arms with recesses therein which form the pivot bearing as previously described. Each part has a semi-circular recess 74 and when the two parts are assembled the recesses form an opening for the mounting screw. The screw when positioned in the opening holds the assembled flange against the rail with the notches 75 fitting in a groove in the rail to prevent sliding movement of the dovetail joint. This holds the members together in fixed positions and also mounts the flange on a fixed rail of the action as illustrated in Fig. 1.

Fig. 11 shows still another embodiment of the invention wherein the flange is formed of two parts 80 and 81. These parts have arms extending therefrom with bearing recesses therein as in prior embodiments. The parts 80 and 81 are held in assembled relation by a bracket 82 which has downwardly extending portions 83 which fit in recesses 84 and 85 of the two parts. Accordingly, the bracket 82 holds the two flange parts 80 and 81 in assembled relation. The bracket 82 has an aperture 86 and the parts 80 and 81 have semi-circular recesses 87 for receiving the mounting screw. The screw holds the bracket 82 and the parts 80 and 81 firmly in place with respect to each other to hold the flange in assembled relation, and also mounts the flange on the rail. The parts of the flange have recesses 88 on the bottom side thereof which provide cooperating notched portions with a recess in the rail as previously described. Similar recesses may be provided on the top sides which will receive an indentation of the bracket 82. By such a construction the two parts of the flange are completely identical and are thereby interchangeable. Accordingly, both can be formed from a single mold as in the first embodiment described.

Although two different bearing arrangements have been mentioned, that is, wherein recesses are provided in the flange and projections on the movable member, and wherein projections are provided on the flange and recesses in the movable member it is obvious that a great number of different configurations may be used. Figs. 12 to 16 inclusive show a number of such different configurations wherein the bearing provisions are integral parts of the flange and the movable member. In Fig. 12 the movable member 99 has conically shaped bearing projections 100 both mating with and projecting through conically shaped holes 101 in the flange arms 102 and 103.

Fig. 13 shows the construction of the bearing elements of Fig. 7 with the movable member 104 having concavely shaped recesses 108 to mate with convexly shaped projections 105 on the flange arms 106 and 107.

The shaping of the bearing elements shown in Fig. 14, is generally a reversal as compared to Fig. 13. The movable member 109 has convexly shaped projections 110 mating with concavely shaped recesses 111 in the flange arms 112 and 113. This is the structure shown in Figs. 9, 10 and 11.

Fig. 15 shows a reversal of the bearing elements shown in Figs. 3 and 12 in that the movable member 114 has conically shaped recesses 116 mating with conically shaped projections 115 on the flange arms 117 and 118.

In Fig. 16 the structure of Fig. 12 is modified by conically shaping the ends of cylindrical projections 120 on the movable member 119 and to mate with and project through cylindrical and conical holes 121 in the flange arms 122 and 123.

Figs. 17, 18 and 19 show other configurations wherein separate parts are used to provide the bearing surfaces. In Fig. 17 the movable member 90 has secured thereto an insert 91 having projecting end surfaces operating in recesses in the arms of the flange 92. By using such a construction the bearing can be formed of a different material than the moving member itself and this may provide better bearing characteristics in certain applications. Fig. 18 shows a construction somewhat like that of Fig. 17 with the insert 93 having a different configuration. Fig. 19 shows a construction wherein a pair of balls 94 are provided as bearing members operating in recesses 95 in the movable member 96 and also in recesses 97 in the flange 98. It is to be pointed out that the balls 94 cannot merely roll as in a ball bearing to provide pivotal movement, but frictional movement between the balls and the flange and movable member will provide smooth bearing action.

It will be apparent from the above that a very simple construction of a flange providing pivotal mounting for movable member has been provide. The parts may be very simply and inexpensively constructed either by molding plastic material or by die cast metal or powdered metal. By providing interlocking provisions on the two members they may be preliminarily assembled and then the means for fastening the flange to its support serves to lock the members firmly into an integral unit. Various different configurations are illustrated showing that the invention can be practiced by use of various specific structures. Various pivotal constructions may also be used, it being necessary to provide pivotal arrangements which may be fitted together as the two-part flange is assembled and is connected to the movable member. The structure is simplified by the use of the screw or fastening member which holds the flange on the structure of the piano action to at the same time hold the two parts of the flange securely in assembled relation with respect to each other.

I claim:

1. A flange for use in a piano action comprising a rigid body portion having a pair of arms extending therefrom and having aligned bearings in end portions thereof, said body portion including at least two coacting parts each of which includes one of said arms, and means engaging said coacting parts for holding the same in assembled relation and for securing said flange to a support.

2. A flange in accordance with claim 1 wherein said two coacting parts are of identical configuration.

3. A flange in accordance with claim 1 wherein said two coacting parts have interlocking portions for holding said parts in predetermined positions with respect to each other.

4. A flange in accordance with claim 1 wherein one of said coacting parts has right angle positioned projections thereon, and the other one of said coacting parts has right angle positioned grooves therein for receiving said projections to hold said parts in predetermined positions with respect to each other.

5. A flange in accordance with claim 1 wherein said two coacting parts have overlying portions with aligned openings therein, and said means includes a screw extending through said aligned openings for engaging the support.

6. In a piano action having a fixed rail, the combination of a moving member, a rigid flange for pivotally supporting the member from the fixed rail, said flange including at least first and second coacting parts with such parts each including an integral extending arm, said parts having interlocking means for positioning the same in a predetermined assembled relation and having portions shaped to form an opening extending through the parts when assembled in the predetermined relation, said arms having aligned bearing surfaces and said member having bearing surfaces engaging said bearing surfaces of said arms and providing a pivotal connection between said member and said flange, and fastening means engaging said coacting parts and extending through the opening formed in said parts and engaging the rail to hold said parts and said member in assembled relation and for mounting said flange on the rail.

7. The combination of claim 6 wherein said first and second parts are of identical configuration and have interlocking portions for holding said parts in predetermined positions with respect to each other.

8. The combination of claim 6 wherein said first part has a dovetail projection and said second part has a dovetail recess for receiving said projection, and said parts have portions with semi-circular recesses therein which adjoin each other when the parts are assembled to form a circular opening.

9. The combination of claim 6 wherein said bearing surfaces of said arms are formed by recesses in said arms and said bearing surfaces of said member are formed by projections on said member, and said bearing projections are positioned in said bearing recesses in interlocking relation when said parts and said member are held in assembled relation.

References Cited in the file of this patent

UNITED STATES PATENTS

| | | |
|---|---|---|
| 299,912 | Craig | June 3, 1884 |
| 473,242 | Shailer | Apr. 19, 1892 |
| 482,665 | Williams | Sept. 13, 1892 |
| 1,610,743 | Buser | Dec. 14, 1926 |
| 2,610,358 | Martin | Sept. 16, 1952 |
| 2,793,555 | Schwarzbaur | May 28, 1957 |

FOREIGN PATENTS

| | | |
|---|---|---|
| 240,523 | Great Britain | Sept. 28, 1925 |